(12) United States Patent
Mock

(10) Patent No.: US 7,416,373 B2
(45) Date of Patent: Aug. 26, 2008

(54) MOTORCYCLE TIE DOWN/LOCK DOWN SYSTEM

(76) Inventor: Stephen W. Mock, 3917 Wagner Lee Dr., Corpus Christi, TX (US) 78418

(*) Notice: Subject to any disclaimer, the term of this patent is extended or adjusted under 35 U.S.C. 154(b) by 332 days.

(21) Appl. No.: 11/367,804

(22) Filed: Mar. 3, 2006

(65) Prior Publication Data
US 2006/0198711 A1    Sep. 7, 2006

Related U.S. Application Data

(60) Provisional application No. 60/658,511, filed on Mar. 3, 2005.

(51) Int. Cl.
*B60P 7/08* (2006.01)
(52) U.S. Cl. .................. 410/3; 410/7; 410/12; 410/23; 410/30; 410/97; 410/100
(58) Field of Classification Search ............... 410/2, 410/3, 7, 12, 23, 30, 96, 97, 100; 188/32; 224/402, 403, 568, 570, 924; 248/499
See application file for complete search history.

(56) References Cited

U.S. PATENT DOCUMENTS

| | | | |
|---|---|---|---|
| 4,078,821 A | 3/1978 | Kitterman | |
| 6,065,914 A | 5/2000 | Fotou | |
| 6,171,034 B1 | 1/2001 | Burgoon | |
| 6,761,519 B2 | 7/2004 | Alderman | |
| 6,966,732 B2 * | 11/2005 | Gohata | 410/3 |
| 2003/0059269 A1 | 3/2003 | Bosley | |

* cited by examiner

*Primary Examiner*—Stephen Gordon
(74) *Attorney, Agent, or Firm*—G. Turner Moller

(57) ABSTRACT

A tie down system for a two wheeled vehicle includes a support plate providing a wheel chock for receiving the front wheel of the vehicle and a pair of diverging arms extending away from the wheel chock. An adjustable strut connects between the ends of the diverging arms and the frame of the vehicle rearwardly of the pivot connection between the front wheel and the frame. Once adjusted, the struts act like solid links resisting any forces applied by the vehicle when it is being towed. Suitable locks may connect the struts and the vehicle frame providing a measure of security.

20 Claims, 5 Drawing Sheets

MOTORCYCLE TIE DOWN/LOCK DOWN SYSTEM

This application is based on provisional application Ser. No. 60/658,511, filed Mar. 3, 2005, for which priority is claimed.

This invention relates to an apparatus for securing a motorcycle or bicycle to a support, such as a truck or trailer.

BACKGROUND OF THE INVENTION

The problem is to tie down and preferably lock a two wheel vehicle, such as a motorcycle or bicycle, on a trailer, in the bed of a pickup or other truck or to a stationary location. In other words, a system is needed to secure the two wheel vehicle in place so it won't fall over or bounce in a manner that damages the motorcycle or the transport vehicle during transit and provide a measure of security when the motorcycle is on a transport vehicle or when stationary.

Most of the prior art tie down systems involve nylon straps which the user must attach to the motorcycle in some manner and then to the transport vehicle. Attachments to the transport vehicle are generally not difficult because pickup trucks and trailers may be equipped with tie down connections. Attachments to the motorcycle are much more difficult because there is typically no convenient, adequate and secure connection on the motorcycle. In other words, attaching the strap to the motorcycle is a hit-or-miss proposition and is often not as secure as originally believed. In addition, nylon straps deteriorate with weather and the passage of time and usually cannot be locked. Furthermore, nylon straps are subject to being cut so the motorcycle is relatively easy to steal.

Although there are some proposals for non-strap type motorcycle tie down devices, they are not widely commercially available.

Disclosures relevant to the disclosure of this invention are found in U.S. Pat. Nos. 4,078,821; 6,065,914; 6,171,034; 6,761,519 and printed patent application 2003/0059269.

SUMMARY OF THE INVENTION

In this invention, a two wheel vehicle such as a motorcycle or bicycle is secured in an upright safe position using a solid metal-to-metal device which can easily be locked. Because the device is typically made entirely of metal as contrasted with nylon straps, it is cut resistant and does not weather with time. This invention comprises, as major components, a wheel chock for receiving a wheel of the motorcycle, a pair of arms that diverge away from the wheel chock and a pair of adjustable struts that are secured between the motorcycle frame and the arms. The connections between the adjustable struts and the motorcycle frame are by the use of conventional tubing clamps. The connections between the arms and the adjustable struts are by the use of conventional metal connections. The arms and chock are typically secured to the transport vehicle by threaded fasteners.

It is an object of this invention to provide an improved apparatus for securing a two wheeled vehicle to a support.

A more specific object of this invention is to provide an improved apparatus for securing and locking a two wheeled vehicle to a transport vehicle without the use of flexible straps.

A further object of this invention is to provide an improved apparatus for securing a two wheeled vehicle to a transport vehicle by using a wheel chock and a system forcing a wheel of the vehicle into the chock.

These and other objects and advantages of this invention will become more apparent as this description proceeds, reference being made to the accompanying drawings and appended claims.

DETAILED DESCRIPTION

Figure 1:
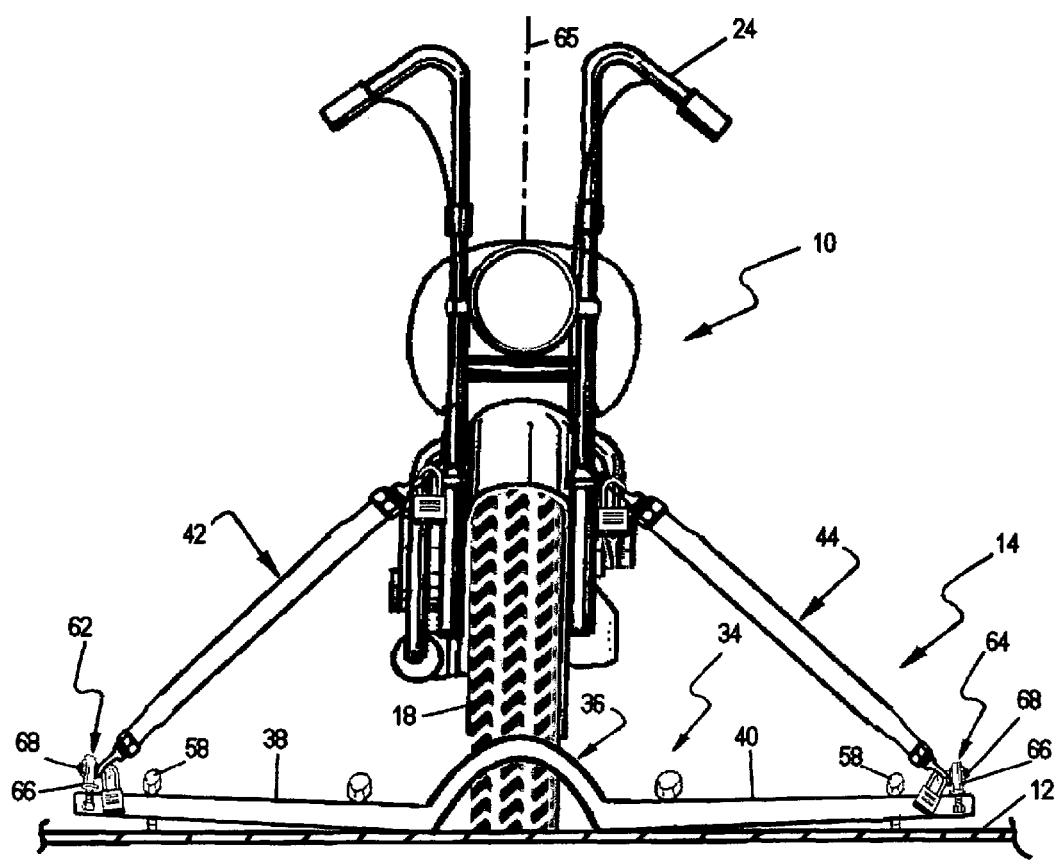
FIG. 1 is a slightly isometric front view, viewed from slightly above the plane of an underlying support, showing a motorcycle secured by a device of this invention to the underlying support shown in cross-section.
Figure 2:
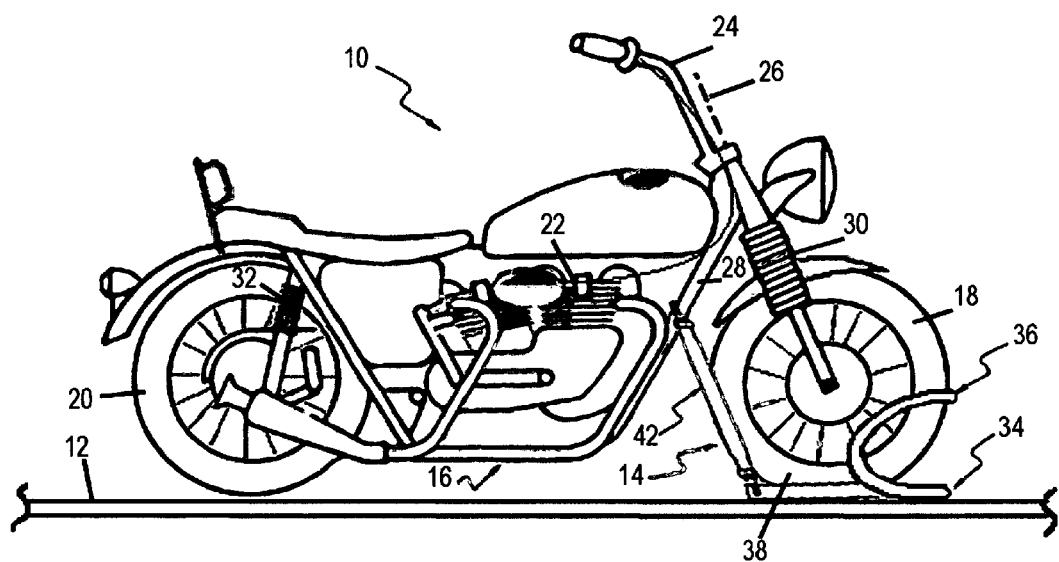
FIG. 2 is a side view of the motorcycle of FIG. 1.
Figure 3:
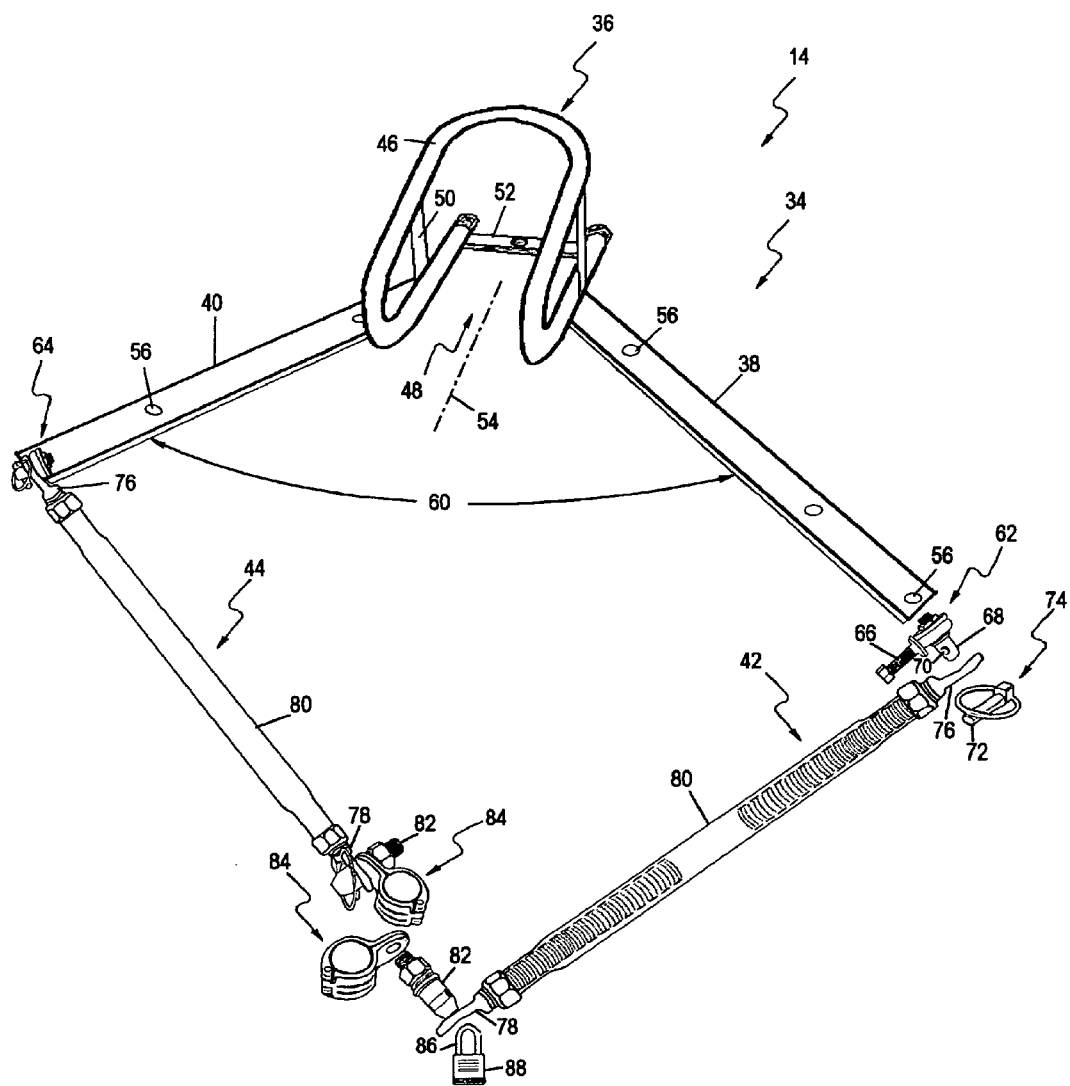
FIG. 3 is an exploded isometric view of the securing device of this invention, illustrating a support plate and a pair of adjustable struts.

Referring to FIGS. 1-3, a motorcycle 10 is illustrated as being tied to a support 12 by a system 14 of this invention. The support 12 may be part of a trailer (not shown), a bed of a pickup truck (not shown) or other transport vehicle or may be a stationary element, such as a concrete floor.

The motorcycle 10 is of conventional design, having a frame 16, front and rear wheels 18, 20, a suitable motor 22 and the like. The motorcycle 10 is steered by handle bars 24 which rotate the front wheel 18 about an inclined but mainly upright pivot axis 26. The frame 16 of almost all motorcycles includes a pair of tubular frame members 28 adjacent the front of the motorcycle 10 but rearwardly of the pivot axis 26. Almost all motorcycles include a suspension system including combined spring and shock absorber assemblies 30, 32.

As shown best by a comparison of FIGS. 2 and 3, the tie down system 14 of this invention comprises, as major components, a support plate 34 providing a wheel chock 36 and a pair of arms 38, 40 and a pair of adjustable struts 42, 44.

The wheel chock 36 may be of any suitable type such as a simple bent tubular member 46 shown in FIG. 3 having an open back 48 receiving the front wheel 18 of the motorcycle 10 and a closed front preventing forward rolling movement of the motorcycle 10. Suitable columns 50 prevent collapse of the chock 36 from a vertical load and a strap 52 prevents spreading of the generally U-shape of the wheel chock 36 and provides a passage for a fastener securing the support plate 34 to the support 12. It will be seen that the simple chock 36 only prevents forward rolling movement and does not impede rearward rolling movement. This is advantageous when loading and unloading the motorcycle 10 because there is no additional force required by the user to unload the motorcycle 10.

The wheel chock 36 may be of any other suitable type, such as a wheel capture chock in which the wheel rides over a rocking channel to retard rearward as well as prevent forward rolling of the motorcycle 10. Such chocks are well known in the art and are made by a variety of manufacturers such as Adventure Sport Products of Golden, Colo. or Bike Pro of Canada.

The support plate 34 is typically symmetrical, i.e. it contains mirror image halves about an axis 54. The arms 38, 40 are preferably substantial members to accommodate any loads imparted by a motorcycle that wants to tilt or fall over. Although the arms 38, 40 may be flat straps, it is preferred that the arms 38, 40 be metal tubing of square or rectangular cross-section, i.e. rectilinear. Suitable openings 56 are provided to receive threaded fasteners 58 and thereby attach the support plate 34 to the support 12.

The arms 38, 40 provide several important advantages. First, they are sufficiently robust to accommodate the loads involved. Second, they provide considerable surface area acting on the underlying support 12 which may not otherwise be capable of easily handling such loads, as in the case of pickup truck beds and/or utility trailer decks which may be as flimsy as expanded metal. Third, they establish the location for the connections 62, 64 thereby establishing one end of the struts 42, 44 and thereby partly dictating the angle of the struts 42, 44 relative to the motorcycle frame 16. For this reason, it is much preferred that the arms 38, 40 be fixed, as by welding or threaded fasteners, to the wheel chock 36 but it will be recognized that they can be separate structures.

In the embodiment of FIG. 3, the arms 38, 40 are straight and diverge rearwardly away from the wheel chock 36 in an obtuse angle 60. Although the angle 60 may vary substantially, a preferred angle is on the order of 100-120°. The arms 38, 40 diverge in order to position a connection 62, 64 at a location laterally and rearwardly of the wheel chock 36 to provide an appropriate angle between the struts 42, 44 and the motorcycle frame 16 to which the struts connect. It is desired that the struts 42, 44 be substantially inclined to a vertical axis 65 of the motorcycle 10 as shown in FIG. 1 to provide sufficient leverage to prevent the motorcycle 10 from tipping over. It will be appreciated that as the struts 42, 44 become more vertical, greater forces will be generated to maintain the motorcycle 10 upright because the struts have less leverage.

It is also desired that the struts 42, 44 be substantially inclined to the vertical as shown in FIG. 2 so the struts 42, 44, acting in tension, can impart a forward force to the motorcycle 10 in the event the motorcycle 10 attempts to move rearwardly, i.e. in a direction out of the wheel chock 36. It is also desired that the struts 42, 44 attach to the frame 16 of the motorcycle 10, as contrasted to the handle bars 24 or movable front wheel 18 or any assemblage rotatable with the handle bars 24 or front wheel 18. Thus, the struts 42, 44 attach to the frame members 28 rearwardly of the pivot axis 26. This is of considerable importance because it provides a safe, sturdy assembly without restraining the rear wheel 20 of the motorcycle 10. This allows the tie down system 14 of this invention to be used on utility trailers without the use of a channel running lengthwise down the trailer. The tie down system 14 according acts without interfering substantially with other uses of the trailer. An analysis of motorcycle tie down devices will reveal that any system that attaches to the handle bars will necessarily restrain the rear wheel because the rear of the motorcycle is otherwise free to move or pivot about the axis 26.

To these ends, the struts 42, 44 attach to the divergent ends of the arms 38, 40 by suitable connections 62, 64. The connections 62, 64 may be of any suitable type and are illustrated as comprising a eye bolt 66 which threads into a nut (not shown) welded in place inside the end of the arms 38, 40 and a linch pin bolt 68 which is prevented from passing through the eye of the bolt 66 by a suitable nut and washer arrangement. The linch pin bolt 68 includes a shank having an opening 70 for receiving a shank 72 of a linch pin 74. Linch pin bolts are made by manufacturers known as SMA and are available from farm equipment suppliers such as Gulf Tractor Supply of Corpus Christi, Tex.

The struts 42, 44 are capable of resisting loads in tension or in compression and are preferably turnbuckles of a particular type. The struts 42, 44 include a pair of threaded rigid eye bolts 76, 78 received in each end of a long internally threaded sleeve 80. The eye bolts 76 of the struts 42, 44 are received on the linch pin bolts 68 of the connections 62, 64 thereby providing a stable robust connection between the support plate 34 and the struts 42, 44. As shown in the bottom of FIG. 3, the eye bolts 76, 78 are capable of substantial movement out of the sleeve 80 thereby providing a substantial degree of adjustment in order to accommodate motorcycles of different configuration.

The eye bolts 78 on the upper ends of the struts 42, 44 receive a linch pin bolt 82 on which is mounted a tubing clamp 84 of a type that is designed to be mounted on tubular members of motorcycle frames. The clamp 84 illustrated in FIG. 3 is known as a split or pivoted clamp and is available from a variety of manufacturers including Harley Davidson. This type clamp is conventionally used to connect highway pegs to the motorcycle frame. It has the unusual characteristic of being able to clamp tightly onto the tubular frame members 28 without collapsing the tubing and without substantially scratching the tubing and is accordingly quite suitable for use in this invention.

An important feature of this invention is that the struts 42, 44 are not tensioned as to pull down substantially on the motorcycle to an extent where the spring and shock assemblies 34, 36 are collapsed or stressed. This saves wear and tear on the shock absorber seals and prevents premature failure of the spring. Because the struts 42, 44 do not actively apply a force to the motorcycle 10, they do not force it into the wheel chock 36 as contrasted to spring forces and the like which can pinch the front tire 18 and thereby warp the tire or delaminate the tire plies.

This also allows the motorcycle 10 to bounce slightly when being towed, using both the suspension system of a transport vehicle as, well as the suspension system of the motorcycle 10 thereby providing a safe stable support for the motorcycle 10. It will accordingly be seen that the struts 42, 44 are adjustable only to accommodate motorcycles or bicycles of different configuration. Once the struts 42, 44 are adjusted to be of the correct length, they simply fit onto the linch pin bolts 68, 82 and require no force to tighten them up or. Thus, once adjusted to fit a particular motorcycle, the struts 42, 44 act as solid links and, in an at rest position, apply no force to the motorcycle 10. Thus, the struts 42, 44 do not apply forces to the motorcycle 10 on their own accord. Instead, the struts 42, 44 provide resistance or a reaction to forces applied by the motorcycle 10. Because the struts 42, 44 are oppositely directed, any force applied by tilting of the motorcycle 10 acts to put one of the struts in tension and the other strut in compression.

Another important feature of this invention is the ability to lock the motorcycle 10 to the system 14 of this invention. Each of the linch pin bolts 68, 82 includes a passage for receiving either the shank 72 of the safety ring 74 or a shackle 86 of a lock 88. In fact, locks on the linch pin bolts 82 are normally sufficient to prevent theft of the motorcycle 10.

Installation of the system 14 will now be apparent. The control plate 34 is fixed to the support 12 by the use of suitable threaded fasteners 58. The motorcycle 10 is pushed or driven onto the support 12 so the front wheel 18 enters the wheel chock 36. The connections 62, 64 are installed on the ends of the arms 38, 40 and the safety rings 74 installed. The clamps 84 are loosely attached to the frame members 28. The struts 42, 44 are connected to the linch pin bolts 68 and extended toward the clamps 84. The position of the clamps 84 and the overall length of the struts 42, 44 are adjusted until the upper eye bolts 78 slip easily over the linch pin bolts 82. Either the safety rings 74 or locks 88 are installed on the linch pin bolts 82.

When it is desired to remove the motorcycle 10 from the tie down system 14, the locks 88 or safety rings 74 are removed from the linch pin bolts 82 and the motorcycle 10 is backed out of the wheel chock 36 and off the support 12. When it is desired to replace the motorcycle 10 on the support 12, the motorcycle 10 is pushed or driven into the wheel chock 36 and the struts 42, 44 reattached to the linch pin bolts 84.

Figure 4:
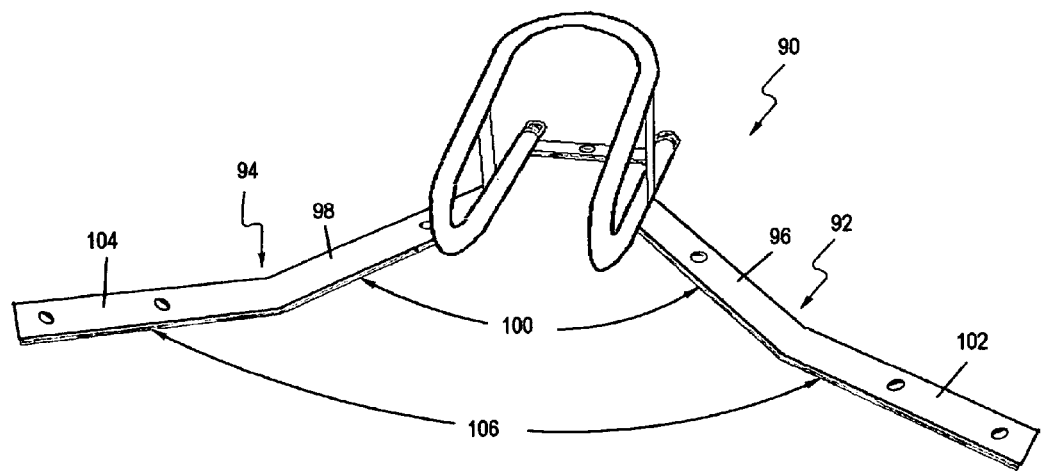
FIG. 4 is an isometric view of another support plate, showing modified arms to accommodate a motorcycle of slightly different configuration.

Referring to FIG. 4, there is illustrated another embodiment of a support plate 90 which differs from the support plate 34 in that the arms 92, 94 are bent rather than straight in order to increase the lateral distance between the ends of the arms 92, 94 in order to accommodate motorcycles of slightly different configuration or which include fairings, housings or other obstructions to the struts 42, 44. To this end, the arms 92, 94 include first straight sections 96, 98 at a first obtuse angle 100 and second straight sections 102, 104 at a second larger obtuse angle 106. It will accordingly be apparent that the lateral distance between the connections 62, 64 may be established in a variety of ways, including curved arms.

Figure 5:
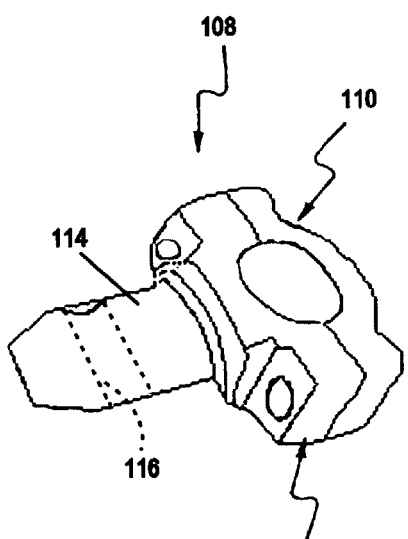
FIG. 5 is an isometric view of another tube clamp which may be used in this invention.

Referring to FIG. 5, there is illustrated another embodiment of a tubing clamp 108 which includes a generally semicircular half 110 and a second half 112 providing a pin 114 having a passage 116 therethrough. Suitable threaded fasteners (not shown) are provided to secure the halves 110, 112 together.

Figure 6:
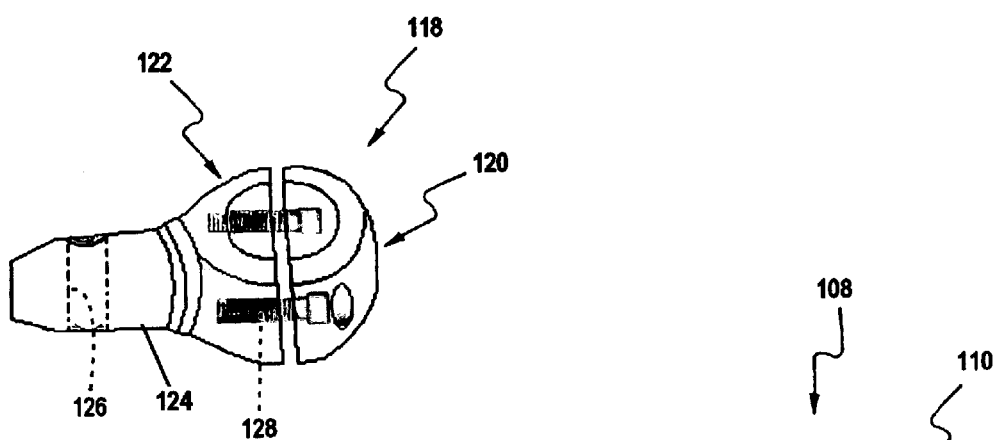
FIG. 6 is an isometric view of a slightly different type tube clamp that may be used in this invention.

Referring to FIG. 6, there is illustrated another embodiment of a tubing clamp 118 which includes a generally semicircular half 120 and a second half 122 providing a pin 124 having a passage 126 therethrough. Suitable threaded fasteners 128 secure the halves 120, 122 together.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A tie down system for securing a two wheel vehicle to an underlying support, comprising
    a wheel chock having an open back for receiving a wheel of the vehicle and a closed front preventing the vehicle from rolling forwardly;
    a pair of arms for attachment to the support diverging away from the wheel chock and providing a pair of divergent ends spaced laterally and rearwardly of the wheel chock; and
    a pair of adjustable struts providing resistance, in tension and in compression, when the vehicle attempts to tilt from side to side, one of said struts being connected to each of the divergent ends and having a tube clamp on a free end thereof for connection to a tubular frame member of the vehicle, an angle of the adjustable struts placing the adjustable struts in tension when the vehicle attempts to move backwardly out of the wheel chock.

2. The tie down system of claim 1 wherein the arms comprise metal tubing.

3. The tie down system of claim 2 wherein the metal tubing is of rectilinear cross section.

4. The tie down system of claim 1 wherein the arms are straight.

5. The tie down system of claim 1 wherein the arms include first segments adjacent the wheel chock diverging at a first predetermined angle and second segments diverging at a second predetermined angle larger than the first predetermined angle.

6. The tie down system of claim 1 wherein the adjustable struts are turnbuckles.

7. The tie down system of claim 6 wherein each turnbuckle includes an eye at each end having a threaded neck rigid with the eye and a sleeve having threaded openings at each end thereof receiving the threaded necks.

8. The tie down system of claim 1 wherein the adjustable struts, once adjusted, comprise solid links.

9. The tie down system of claim 1 wherein the arms are fixed to the wheel chock.

10. In combination, a two wheel vehicle having a front wheel rotatable by handle bars about a pivot axis for steering the vehicle and a pair of generally upright stationary frame members rearward of the handle bars and a tie down system for securing the vehicle to an underlying support, the tie down system comprising
    a wheel chock having an open back for receiving the front wheel of the vehicle and a closed front preventing the vehicle from rolling forwardly;
    a pair of arms attached to the support and providing a pair of divergent ends spaced laterally and rearwardly of the wheel chock and forwardly of the stationary frame members; and
    a pair of adjustable struts, one of said struts connected to each of the divergent ends, having a tube clamp on a free end thereof connected to one of the tubular frame members of the vehicle, an angle of the adjustable struts placing the adjustable struts in tension when the vehicle attempts to move backwardly out of the open back of the wheel chock.

11. The tie down system of claim 10 wherein the arms comprise metal tubing of rectilinear cross-section.

12. The tie down system of claim 10 wherein the arms are straight and diverge away from the wheel chock.

13. The tie down system of claim 10 wherein the arms diverge away from the wheel chock and include first segments adjacent the wheel chock diverging at a first predetermined angle and second segments diverging at a second predetermined angle larger than the first predetermined angle.

14. The tie down system of claim 10 wherein the adjustable struts comprise turnbuckles, each turnbuckle including an eye at each end having a threaded neck rigid with the eye and a sleeve having threaded openings at each end thereof receiving the threaded necks.

15. The tie down system of claim 10 wherein the adjustable struts, once adjusted, comprise solid links.

16. A tie down system for securing a two wheel vehicle to an underlying support, comprising
    a wheel chock having an open back for receiving a wheel of the vehicle and a closed front preventing the vehicle from rolling forwardly;
    a pair of arms for attachment to the support, the arms diverging away from the open back of the wheel chock and providing a pair of divergent ends spaced laterally and rearwardly of the wheel chock; and
    a pair of solid links providing resistance, in tension and in compression, when the vehicle beings to tilt from side to side, one of said links being connected to each of the divergent ends and having a tube clamp on a free end thereof for connection to a tubular frame member of the vehicle, an angle of the solid links placing the solid links in tension when the vehicle attempts to move backwardly out of the wheel chock.

17. The tie down system of claim 16 wherein the arms comprise metal tubing of rectilinear cross-section.

18. The tie down system of claim 16 wherein the arms are straight.

19. The tie down system of claim 16 wherein the arms include first segments adjacent the wheel chock diverging at a first predetermined angle and second segments diverging at a second predetermined angle larger than the first predetermined angle.

20. The tie down system of claim 16 wherein the arms are fixed to the wheel chock.

* * * * *